United States Patent
Roberts et al.

(10) Patent No.: US 6,330,593 B1
(45) Date of Patent: Dec. 11, 2001

(54) SYSTEM FOR COLLECTING USE DATA RELATED TO PLAYBACK OF RECORDINGS

(75) Inventors: Dale Tyson Roberts, Sausalito; Ann E. Greenberg, San Anselmo, both of CA (US)

(73) Assignee: CDDB Inc., Indianapolis, IN (US)

( * ) Notice: Subject to any disclaimer, the term of this patent is extended or adjusted under 35 U.S.C. 154(b) by 0 days.

(21) Appl. No.: 09/379,589

(22) Filed: Aug. 24, 1999

Related U.S. Application Data

(62) Division of application No. 09/060,876, filed on Apr. 15, 1998, now Pat. No. 6,154,773, and a division of application No. 08/838,082, filed on Apr. 15, 1997, now Pat. No. 5,987,525.

(51) Int. Cl.[7] .................................................. G06F 13/00
(52) U.S. Cl. .......................... 709/217; 709/202; 709/219; 709/329
(58) Field of Search ................................. 709/201, 202, 709/203, 217, 218, 219, 223, 224, 227, 313, 329; 705/26, 27

(56) References Cited

U.S. PATENT DOCUMENTS

| | | | |
|---|---|---|---|
| 4,599,644 | * 7/1986 | Fischer ...................................... | 348/4 |
| 4,646,145 | * 2/1987 | Percy et al. ............................. | 348/13 |
| 5,237,157 | * 8/1993 | Kaplan ................................. | 235/375 |
| 5,404,393 | * 4/1995 | Remillard ........................... | 379/93.25 |
| 5,710,884 | * 1/1998 | Dedrick ............................... | 709/217 |
| 5,721,827 | 2/1998 | Logan et al. . | |
| 5,774,664 | 6/1998 | Hidary et al. . | |
| 5,774,666 | * 6/1998 | Portuesi ................................ | 709/218 |
| 5,778,181 | 7/1998 | Hidary et al. . | |
| 5,778,187 | 7/1998 | Monteiro . | |
| 5,796,393 | 8/1998 | McNaughton et al. . | |
| 5,796,952 | 8/1998 | Davis et al. . | |
| 5,809,250 | 9/1998 | Kisor . | |
| 5,809,512 | 9/1998 | Kato . | |
| 5,905,865 | * 5/1999 | Palmer et al. ........................ | 455/3.1 |
| 5,949,411 | * 9/1999 | Doerr et al. ......................... | 345/327 |
| 5,963,916 | * 10/1999 | Kaplan ................................. | 705/26 |

FOREIGN PATENT DOCUMENTS

| | | |
|---|---|---|
| 194 143 | 9/1986 | (EP) . |
| WO97/05616 | 2/1997 | (WO) . |

OTHER PUBLICATIONS

M. Masha et al. "Interactive education: Transitioning CD–ROMs to the Web" Computer Network And ISDN Systems, vol. 27, No. 2, Nov. 1994, pp. 267–272.

* cited by examiner

Primary Examiner—Viet D. Vu

(57) ABSTRACT

Entertainment content complementary to a musical recording is delivered to a user's computer by means of a computer network link. The user employs a browser to access the computer network. A plug-in for the browser is able to control an audio CD or other device for playing the musical recording. A script stored on the remote computer accessed over the network is downloaded. The script synchronizes the delivery of the complementary entertainment content with the play of the musical recording.

103 Claims, 6 Drawing Sheets

SYSTEM FOR COLLECTING USE DATA RELATED TO PLAYBACK OF RECORDINGS

CROSS-REFERENCE TO RELATED APPLICATIONS

This is a divisional of U.S. patent application Ser. No. 08/838,082 filed Apr. 15, 1997, now U.S. Pat. No. 5,987,525, and U.S. patent application Ser. No. 09/060,876 filed Apr. 15, 1998, now U.S. Pat. No. 6,154,773, both incorporated herein by reference.

BACKGROUND

1. Field of the Invention

This invention pertains to the field of computer networking, and more particularly to the use of network protocols to provide services to users that are related to CD ROMs, audio recordings and other distributed media.

2. Related Art

Over the past few years, on-line services have experienced explosive growth and have become a major new form of entertainment. Alongside this new entertainment, more traditional forms such as musical recordings have continued to be consumed on a massive scale.

The traditional experience of the musical recording is listening by a small group of persons gathered together in a room. The music fills the room acoustically, but there is little associated visual content, and there is only a limited interaction with the recording, consisting essentially of deciding which tracks to play and performing simple transformations on the recorded sound, such as setting the volume or applying an audio equalizer. This traditional experience dates back to the early age of 78 r.p.m. musical recordings almost a century ago.

The traditional production of a musical recording complements the traditional experience of the recording. The recording is produced in a number of recording sessions, subject to careful mixing and editing, and then released to the public. At that point, the recording is in a fixed form, nowadays an audio CD, whose purpose is to record as faithfully as possible the final sonic experience designed by its authors, the musicians, producer, and recording engineers.

Music videos have supplemented the traditional experience of musical recordings by allowing the association of visual content with tracks of such a recording. In practice, however, music videos have been broadcast, with all the problems of lack of user control which that implies, and they have not contributed to interactivity or participation by the consumer. On-line services offer opportunities for enriching the experience associated with prerecorded material. The present invention is addressed to computer programs, systems, and protocols which can fulfil this promise.

SUMMARY OF THE INVENTION

It is therefore an object of this invention to provide computer programs, systems, and protocols which allow producers to deliver entertainment complementary to distributed media recordings by means of on-line services such as the Internet. It is a further object of this invention to provide computer programs, systems, and protocols which allow such complementary entertainment to be meaningfully interactive for the consumer, such that the consumer can also be a creator of the experience.

It is a further object of the invention to achieve the foregoing objects by means of implementations designed to attain integration with existing environments and programs, particularly on the Internet, while retaining the flexibility to adapt to the continuing evolution of standards for on-line services.

In a first aspect of the present invention provides a means for producers and sellers of distributed media such as CDs to maintain and strengthen their connection to their customers. Record companies download and periodically update a central library of complementary content for CDs the company has in the market. The software of the present invention operate as a plug-in to a users web browser and directs a user with a record company's CD to a particular section of the central library appropriate for the user's CD.

In another aspect of the present invention, called "CD Watcher" data representative of the users listening habits relative to a record company's CD is transferred to the record company when complementary content is delivered to the user over a network connection.

Alternatively, record companies contributing and maintaining the central library have access to the listening habits of all users who have accessed the central library for complementary content.

In another aspect of the invention, software is provided which permits a computer program running on a remote host to control a distributed media player such as a compact disk (CD) player, DVD player, or the like on a user's computer. (For convenience, we use the term "CD" to refer to all distributed media and the term "CD player" to refer also to all distributed media players such as DVD players and similar devices.) The software is designed to permit the remote host both to initiate actions on the CD player and to become aware of actions which the user has initiated by other control means, such as the buttons on the CD player's front panel or a different CD player control program. This aspect of the invention is a buildingblock for the provision of complementary entertainment for CD content when those recordings are fixed in the prevailing contemporary form, the CD.

In another aspect of the invention, visual content, including interactive content, may be delivered over an on-line service in such a way that it is synchronized to the delivery of content from a musical recording. Such visual content may, for example, be synchronized to the playing of an audio CD or other distributed media in the user's computer. The visual content is thematically linked to the musical recording, for example in the manner of a music video.

In a further aspect of the invention, a method is provided for determining or assigning a substantially unique identifier to CD or other distributed media content consisting of a number of tracks. A unique identifier is a useful complement to the delivery of supplementary content in conjunction with the playing of a CD or other distributed media in that it allows the software which delivers the supplementary content to be sure that the CD is in fact the correct CD to which the supplementary content corresponds. If the supplementary content is designed, for example, to accompany the Rosary Sonatas of Heinrich Ignaz Franz Biber, it would presumably not function well if the CD or other distributed media in the user's player were the soundtrack for the film Mary Poppins. The unique identifier also allows a CD or other distributed media to be used as a key to access a premium Web area. Furthermore, the unique identifier can allow the user to be directed to an area of the Web corresponding to the CD or other distributed media which is in the user's machine.

In a still further aspect of the invention, the immensely popular on-line service generally referred to as a "chat room" may be enhanced by means of a link to a CD recording which all persons in the room are playing. A remote host may control distributed media players in multiple remote locations The chat room experience as it exists today in on-line services has a disembodied quality by comparison with traditional face-to-face social encounters in which there are identifiable surroundings. The only common experience to the chat users today are the words of the chat as they fly by on a computer screen, and perhaps the user icons ("avatars") or other visual content occupying a small space on the screen. The use of a musical recording in conjunction with a chat room opens up the possibility of restoring to the experience a degree of the shared ambience of traditional social encounters. Furthermore, shared content such as a musical recording offers a focal point that allows chatseekers to group together by means of shared interests in a particular type of recording.

DESCRIPTION OF PREFERRED EMBODIMENTS

Figure 1:
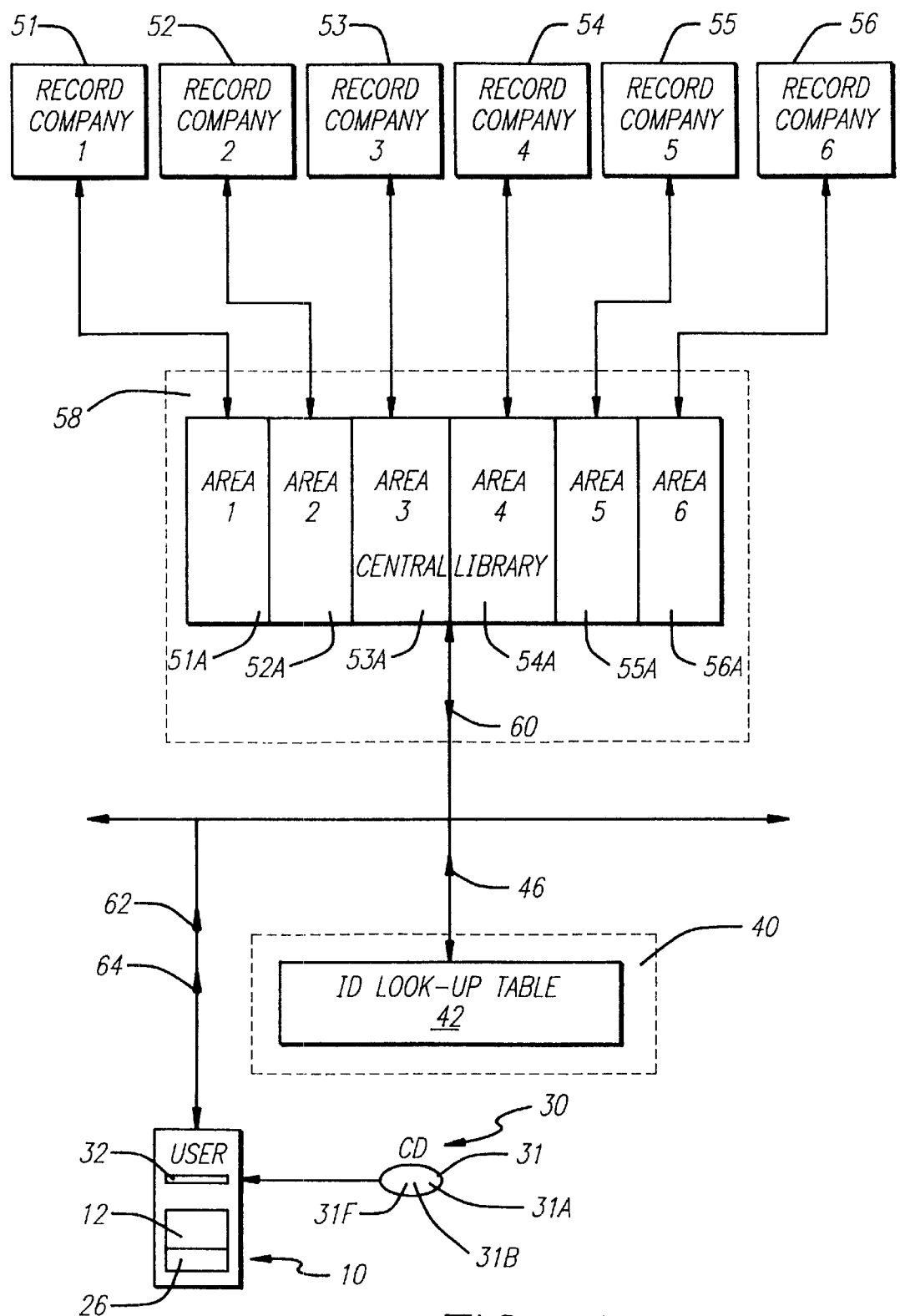
FIG. 1 is a network diagram of a first embodiment of the present invention.
Figure 2:
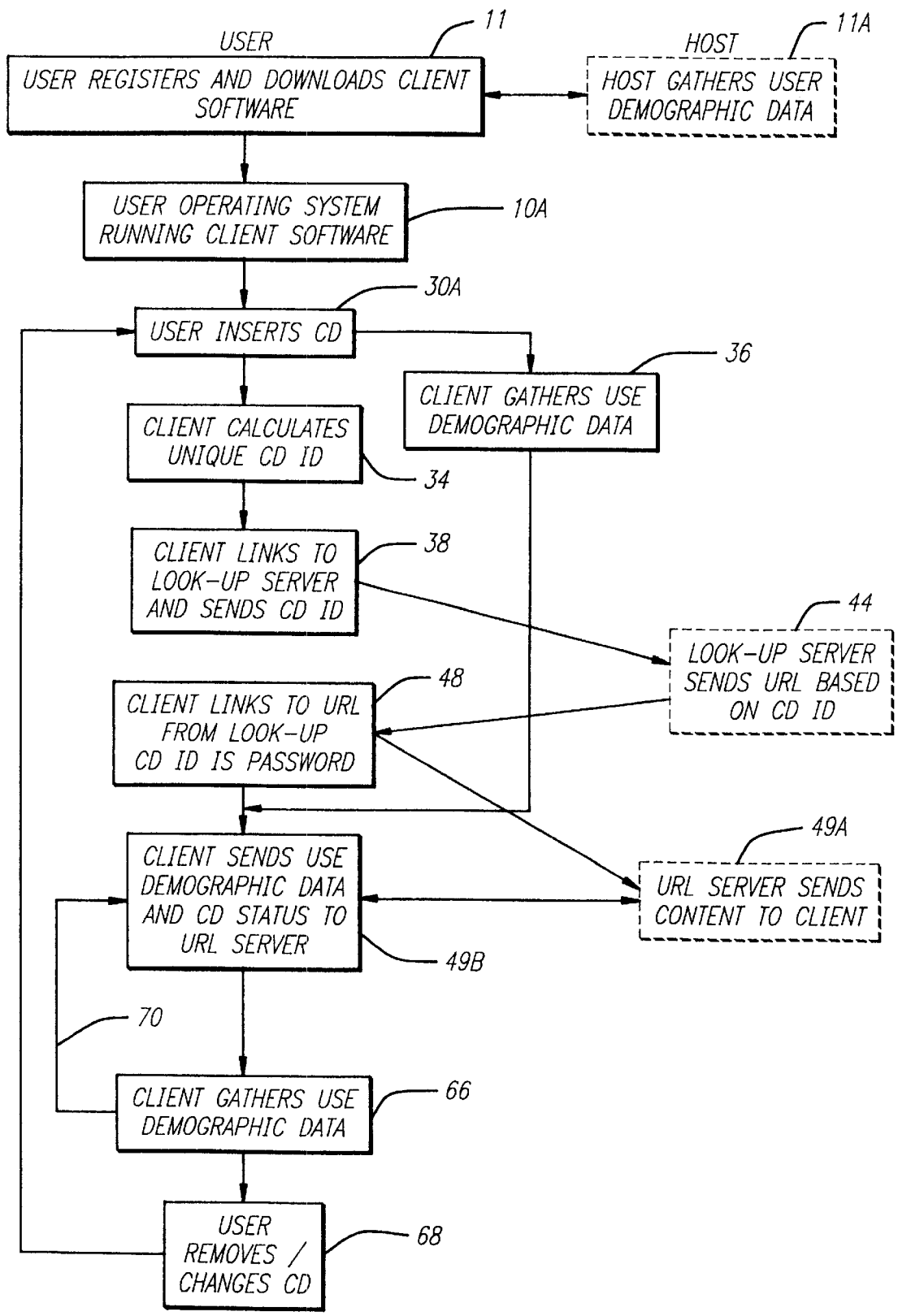
FIG. 2 is a flow diagram of the embodiment shown in FIG. 1.

Referring to FIGS. 1 and 2, an embodiment of the present invention dynamically connects a user playing a CD with a remote host for data exchange. At block 11, the user links to a remote host and requests a download of client 26. To receive the download the user must provide some basic information, name, email, chat name, etc. The registration information is exchanged for client 26 at block 11A. At block 10A user computer 10 is running computer program 12 such as a browser with client 26. At block 30A insertion of CD 30 into player 32 triggers action by client 26. Client 26 takes control of player 32 and scans CD 30. CD 31 may include time code 31A and other encoded data 31B. Client 26 uses the results of the CD scan to calculate a substantially unique CD ID 31, block 34. Some CDs may contain an ID text file or IRC code, there is no universal standard, thus an ID calculation technique may yield a useful ID with any CD. This technique may create a pattern match 31F by sampling a subset of the content of CD 30 and using the sample to create a substantially unique fingerprint 31F of CD 30. While client 26 is calculating CD ID 31, at block 36 use demographic data 62 is also collected and temporarily stored by client 26.

Use demographic data 62 includes but is not limited to CD use profiles including most used tracks, total time of use, most used CDs, average length of time computer 10 is running, software loaded, most used software, software running concurrently with client and the like.

Calculation of a CD ID 31 stimulates client 26 to direct computer program 12 to check a local cache for CD ID 31. IF CD ID 31 is not present in the local cache client 26 links to look up server 40 at block 38. If computer program 12 is not already running, client 26 may launch it. Once the link to look-up server 40 is established, client 26 sends CD ID 31 to look-up server 40. Look-up server 40 compares CD ID 31 against table 42. Table 42 is a look-up table linking CD IDs with some associated content and with particular addresses having complementary content. Other information such as timing and control data, electronic coupons, advertisements and bonus content such as video with timing and control data may also be contained in table 42. At block 44, look-up server 40 sends information such as address 46 to the user in response to receipt of CD ID 31. The information sent to the user may or may not be based on the user demographic data and use demographic data 62 sent to look-up server 40. At block 48 client 26 establishes a link to address 46. Address 46 may be a premium or subscription site such as site 51A in which case CD ID 31 may operate as a password.

In one aspect of the present invention, content suppliers 51–56 such as record companies 1–6 respectively, maintain a central library 50 on the web. Content suppliers may also include advertisers, CD retailers, and other content rights holders. Central library 50 may be on a single server such as look-up server 40 or it may be distributed. Central library So contains the complementary content sites such as site 51A linked by the addresses in table 42 such as address 46. Each content supplier 51–56 may change the content of their site and add new links to additional sites as new CDs are released. As new sites are added, new CD IDs and linked addresses are added to table 42.

At block 49A, server 58 hosting site 51A transfers complementary content 60 to the user's computer 10. Once the user is linked to site 51A, client 26 sends stored use demographic data 62 and CD status data 64 to look-up server 40 and or server 58. At block 66 client 26 continues to update and transfer use demographic data 62 and CD status data 64 to look up server 40 and or server 58 as long as client 26 is running. Closed loop update 70 permits a content supplier, such as content suppliers 51–56, a real-time or near real-time look at which CDs are in use and relative frequency of use of CD elements and related information. Closed loop update 70 also provides control of distributed media playing on a users computer 10. A removal or change of CD at block 68 would return the client to block 30A.

In another embodiment, this invention operates on the World Wide Web. The HTTP protocol on the web is run atop a general connection-oriented protocol, which today is generally TCP/IP, described in Douglas E. Comer, Internetworking with TCP/IP (3d ed. 1995). However, the invention described here is not limited to HTTP running over any particular kind of network software or hardware. The principles of the invention apply to other protocols for access to remote information that may come to compete with or supplant HTTP.

Figure 3:
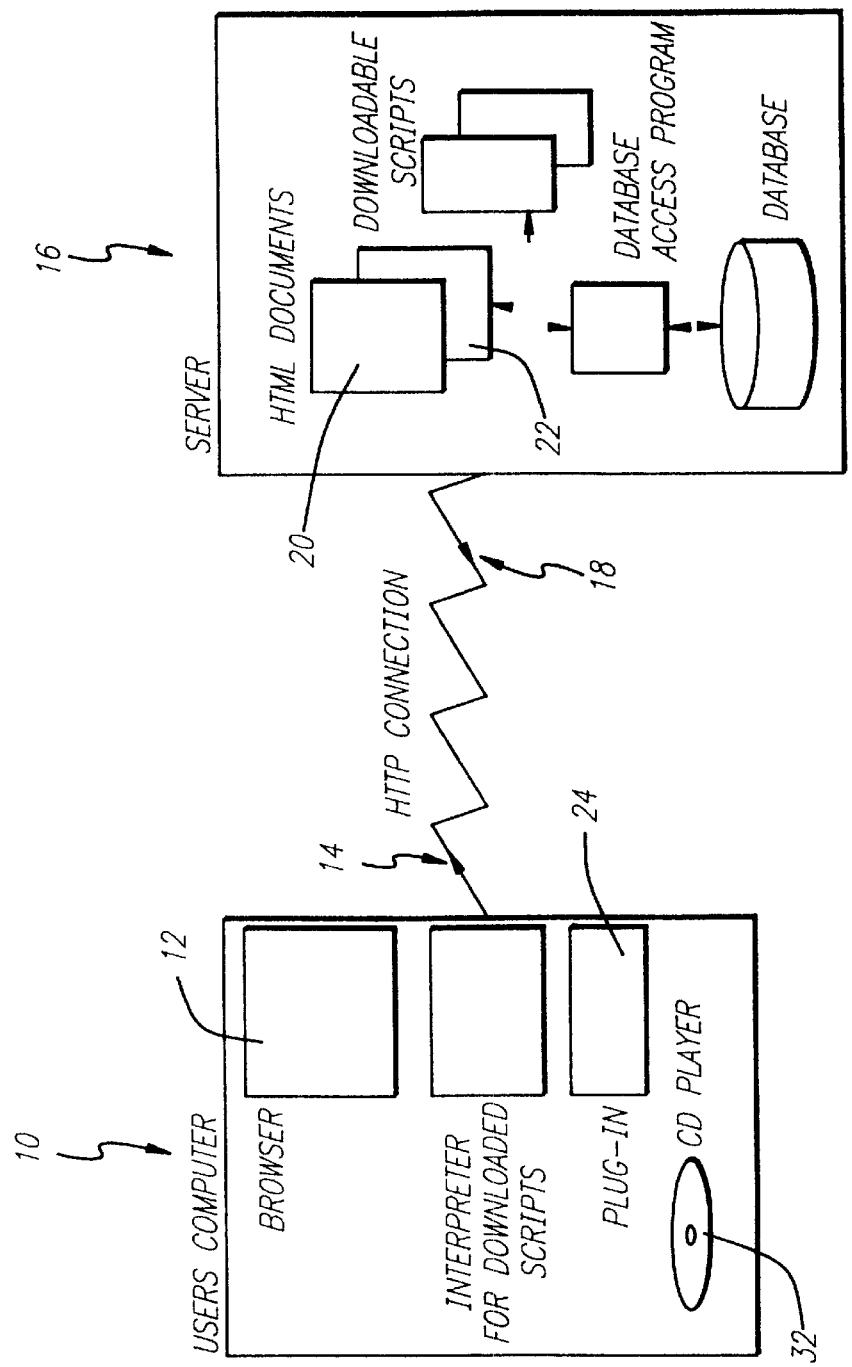
FIG. 3 is a block diagram of the environment in which the present invention operates.

Referring now to FIG. 3, a user sits at his or her computer 10 and runs a computer program 12 such as a browser or other client software. The browser sends out HTTP requests 14 to other computers, referred to as servers such as server 16. In requests, particular items of data, referred to as resources, which are available on servers, are referred to by means of uniform resource locators (URLs), character strings in a particular format defined in Berners-Lee et a!., supra. A URL includes both an identification of the server and an identification of a particular item of data within the server. Reacting to the requests, the servers return responses 18 to the user's browser, and the browser acts upon those responses, generally by displaying some sort of content to the user.

The content portion of the responses can be a "Web page," expressed in the hypertext markup language (HTML) such as pages 20 and 22. That language allows one to express content consisting of text interspersed with bitmap-format images and links (also known as anchors and hyperlinks). The links are further URLs to which the browser may, at the user's prompting, send further requests.

The responses can also include more complex commands to be interpreted by the browser, e.g., commands which result in an animation as discussed below for FIG. 4. HTML itself does not define complex commands, but rather they are considered to belong to separately-defined scripting languages, of which two currently common ones are JavaScript and VBScript.

In addition to extending the function of the browser by means of code written in a scripting language, it is also possible to extend the function of a browser with compiled code. Such compiled code is referred to as a "plug-in." The precise protocol for writing a plug-in is dependent on the particular browser. Plug-ins for the Microsoft browser are referred to by the name of Active X controls.

Plug-ins may be very complex. A plug-in which may advantageously be used in connection with the invention is Shockwave from Macromedia. It permits animations which are part of a server response to be downloaded and played to the user. Shockwave defines its own scripting language called Lingo. Lingo scripts are contained within the downloadable animations which the Shockwave plug-in can play. The general format of a Shockwave animation is a timeline consisting of a series of frames, together with a number of visual objects which appear, perform motions, and disappear at particular frames within the timeline.

To achieve more complex effects within a Shockwave animation, Lingo scripts may be invoked in addition to predefined visual objects.

A currently preferred embodiment of the present invention employs a plug-in, referred to as the command plug-in 24, which provides to a scripting language the ability to command and monitor in a detailed fashion the playing of a CD recording. The command plug-in should provide and monitor, at a minimum, the following basic functions:

(1) Start and stop play.

(2) Get current track and position within the track.

(3) Seek to a track and a position within the track.

(4) Get and set volume.

(5) Get information regarding the CD (e.g., the number of tracks, their lengths, the pauses between tracks).

(6) Get information regarding the capabilities of the CD drive.

Other functions may be provided and monitored, limited only by what the underlying operating system services are able to accommodate. The monitored functions are included in use demographic data 62 which is transferred to server 40 and or servers such as server 58.

The command plug-in may be written in a conventional programming language such as C++. The plug-in must conform to the existing standards for plug-ins, such as those required of Microsoft Active X objects. In order to obtain the information and carry out the functions which the command plug-in makes available to the scripting language, the command plug-in relies on functions which provide control and information regarding the playing musical recording. These functions will depend on the precise source of the recording. If, as in one embodiment of the present invention, the recording being played is an audio CD in the computer CD player, and if the browser is running under Microsoft Windows 3.1 or Windows 95 or Windows CE, these functions would be the MCI functions, which form a part of the Win 32 application programming interface. These functions are documented, for example, in Microsoft Win 32 Programmer's Reference. Different functions may be provided by streaming audio receivers, as for example receivers which capture audio which is coming into the user's computer over a network connection in a suitable audio encoding format such as MPEG.

An important point to note about the implementation of the command plug-in is that the operations which it carries out, as for example "seeks", may take times on the order of a second. It is undesirable for command-plug-in 24 to retain control of computer 10 during that interval, so it is important that command plug-in 24 relinquish control of computer 10 to the browser whenever a lengthy operation is undertaken, and report on the results of the operation via the asynchronous event handling capability used in the common scripting languages.

Given the above summary of the functions which the command plug-in provides, a general knowledge of how to write plug-ins (e.g., of how to write Active X objects), and a knowledge of the relevant application programming interface for controlling the play of the CD (e.g., MCI in Win32), a person skilled in the art could readily and without undue experimentation develop an actual working command plug-in. For this reason, further details of how the command plug-in is implemented are not provided here.

The existence of a command plug-in providing the functions listed above to a scripting language is a foundation on which entertainment complementary to the content of a CD may be constructed. In particular, it is possible to devise, building on this foundation, a method for synchronizing the display of complementary content by means of the scripting language with the events which are occurring on the CD.

Figure 4:
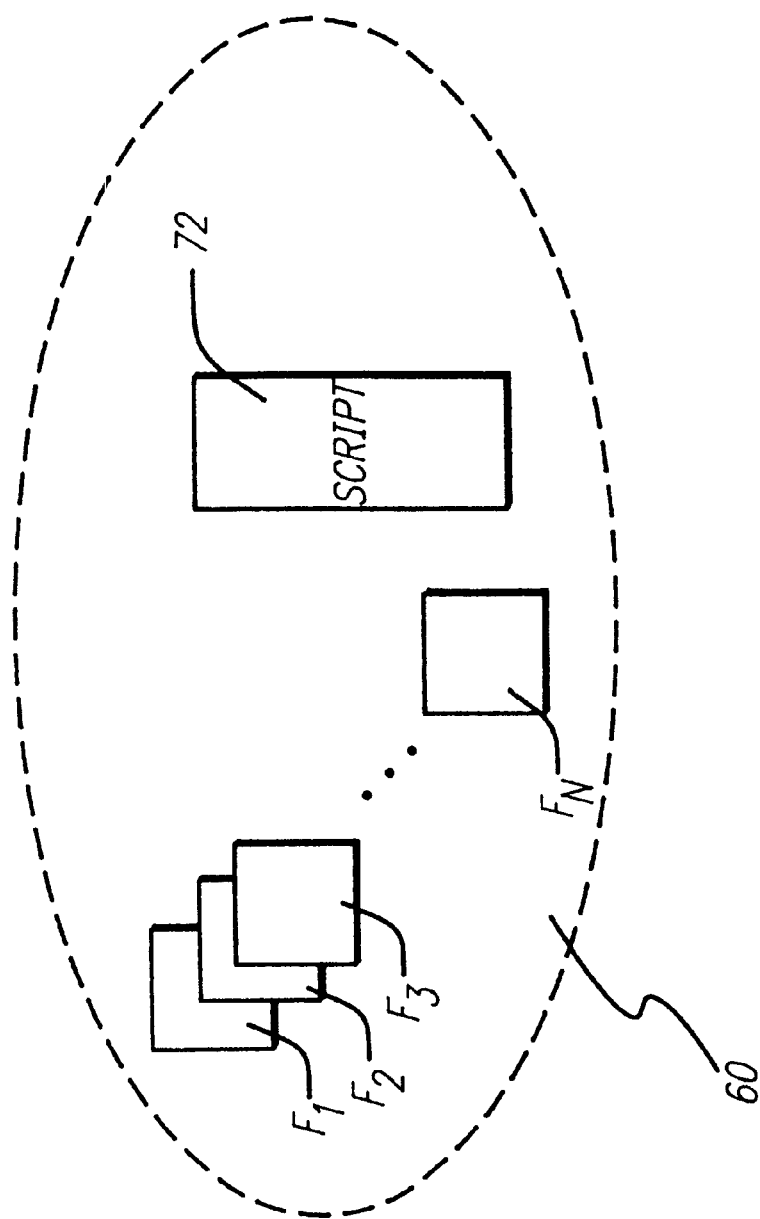
FIG. 4 is a block diagram of complementary content according to an aspect of the present invention.
Figure 5:
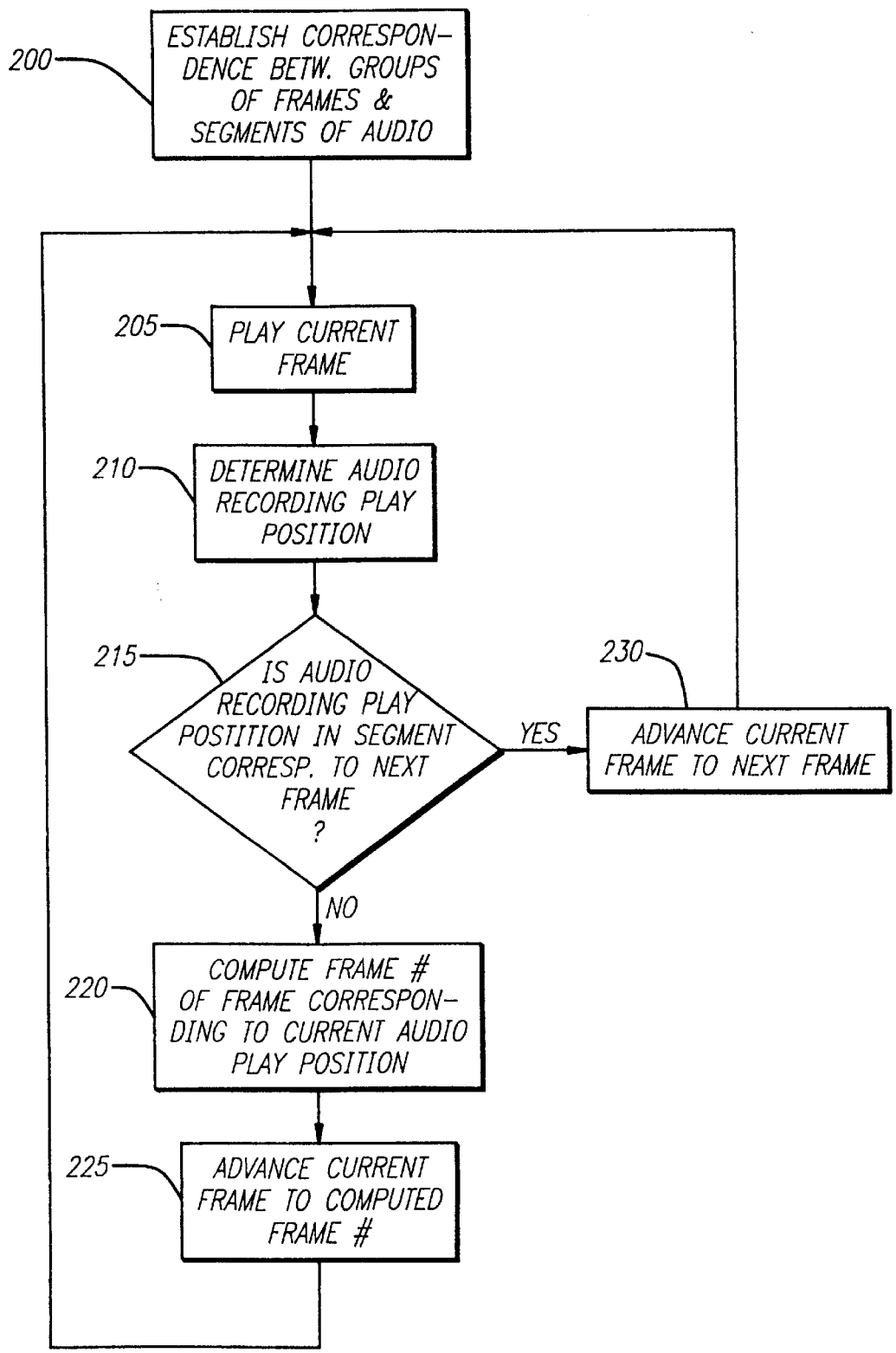
FIG. 5 is a flowchart of the synchronization code of the invention.
Figure 6:
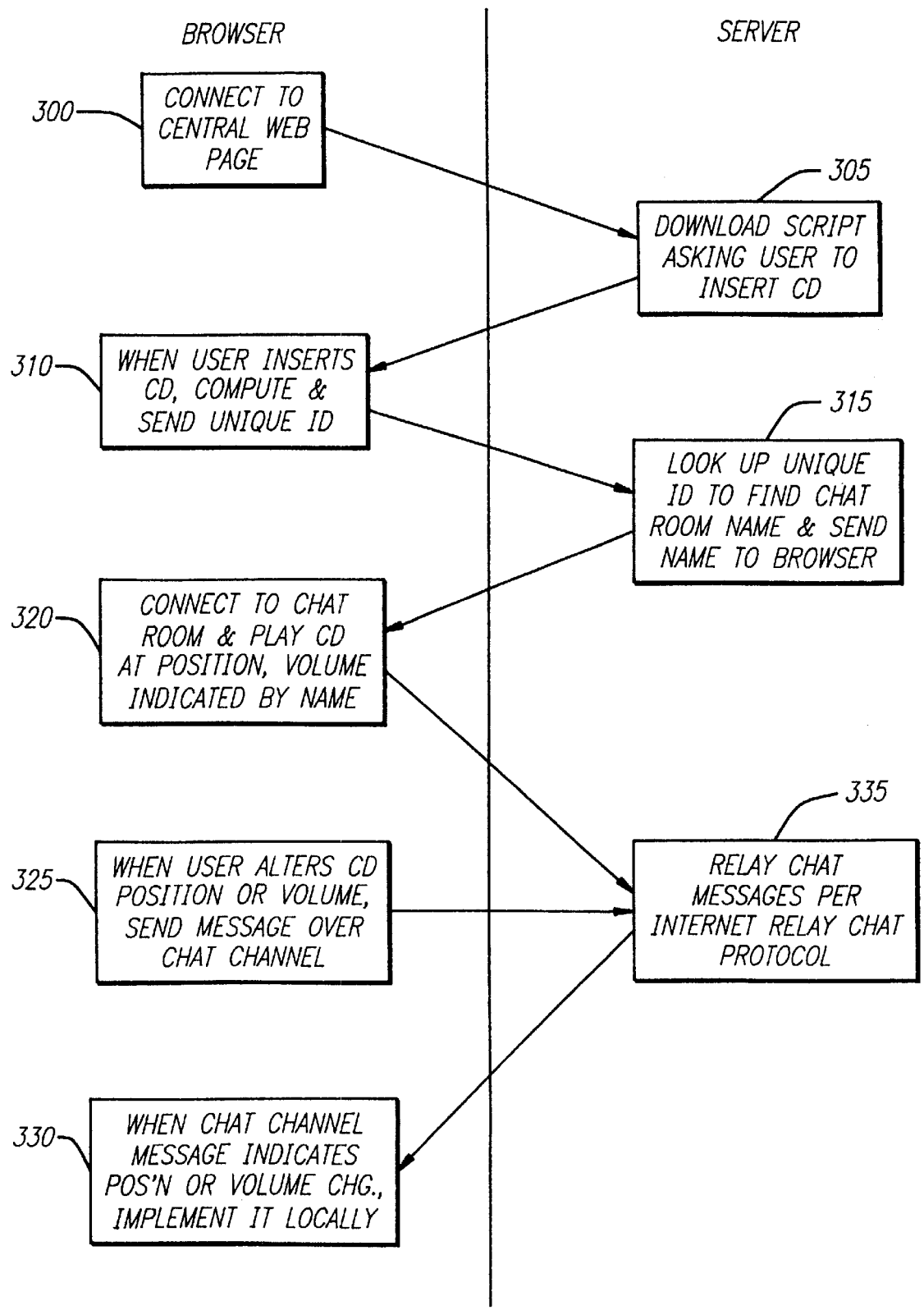
FIG. 6 is a flowchart of the sequence of operations for connecting the present invention to a chat room.

Referring now to FIGS. 4 and 5, synchronization of the complementary content to the CD proceeds as follows. For example, complementary content 60 may be provided by means of animation such as Shockwave animation, including frames F1–Fn and script 72. Complementary content 60 is downloaded from server 58 and displayed for the user by means of a Shockwave plug-in. This downloading may take place before the animation is displayed, or alternatively it may take place as the animation is being displayed, provided the user's connection to the network is fast enough to support download at an appropriate speed. The downloading is a function provided by the Shockwave plug-in itself.

As the Shockwave animation is played, script 72 such as a Lingo script executes each time a frame Fn finishes displaying. The Lingo script contains a description of the relationship which should exist between frames of the animation and segments of the CD content, identified by track number and by time. The Lingo script determines, by means of the command plug-in described above, at which track and time the play of the CD is. It then refers to the description in order to determine which frames of the animation correspond to that portion of the CD. If the current frame is not one of those frames, the Lingo script resets the time line of the animation so that the animation will begin to play at the frame which corresponds to the current position of the CD. This permits the visual content to catch up if it ever lags the CD, for example because downloading from the network has fallen behind, because the user's computer lacks the cycles to play the animation at full speed, or because the user has fast-forwarded the CD.

Referring now to FIG. 4, the synchronization algorithm may control individual frames or groups of contiguous frames. Complementary content 60 includes frames $F_1$–$F_n$ and script 72. At block 200, a correspondence is established between each frame $F_n$ or group of frames and a particular segment of CD 30. At the end of each frame Fn of the animation block 205, the position of CD 30 is determined, block 210. A test is done at block 215 to determine whether the position of CD 30 is within the segment of the recording that corresponds to the group of frames to which the next sequential frame belongs. If the position of CD 30 is within that segment, the playback of the animation proceeds with that next frame block 230. If the position of CD 30 is not within that segment, then at blocks 220 and 225 the playback of the animation is advanced to the frame corresponding to where the CD is.

A further aspect of the present invention is a touring mode. With client 26 in touring mode, a remote device such as server 58 may control one or more user devices through delivery of complementary content 60 interspersed with player 26 control data to provide the one or more users with a guided tour of a particular distributed media such as CD 30.

A still further aspect of the invention is the ability, by making use of command plug-in 24, to provide a technique for establishing a unique identifier for a CD, CD ID 31, which is located in the user's CD player 32. The unique identifier may be based on the number and lengths of the tracks (measured in blocks, i.e., $\frac{1}{75}$ths of a second), so that the identifier would be a concatenation of these lengths. In practice, however, it is desirable to have a somewhat shorter identifier, so the unique identifier is preferably the concatenation of the track lengths expressed in a fairly coarse unit, such as $\frac{1}{4}$th of a second.

Appendix A contains source code, written in C, for a fuzzy comparison algorithm suitable for determining whether two audio CDs are exactly or approximately the same. The fuzzy comparison algorithm proceeds as follows. For each of the two audio CDs to be compared, one determines the lengths of all the tracks in the recordings in milliseconds. One then shifts all track lengths to the right by eight bits, in effect performing a truncating division by $2^8=256$. One then goes through both of the recordings track by track, accumulating as one proceeds two numbers, the match total and the match error. These numbers are both initialized to zero at the start of the comparison. For each of the tracks, one increments the match total by the shifted length of that track in the first CD to be compared, and one increments the match error by the absolute value of the difference between the shifted lengths of the track in the two CDs. When one gets to the last track in the CD with the fewer number of tracks, one continues with the tracks in the other CD, incrementing both the match total and the match error by the shifted lengths of those tracks. Following these steps of going through the tracks, the algorithm then divides the match error by the match number, subtracts the resulting quotient from 1, and converts the difference to a percentage which is indicative of how well the two CDs match.

Appendix B contains source code, written in C, for a comparison algorithm suitable for determining whether two audio CDs are exactly the same. The algorithm generates from the number of tracks, the track lengths, and the start and end times of the tracks an 8-byte value. The high order 4 bytes are obtained by summing the start and end times of all tracks, expressed in milliseconds. The low order 4 bytes are obtained by summing the lengths of all tracks expressed in milliseconds, shifting the sum left ten bits, and adding the number of tracks.

CD ID 31 may be employed as a database key. A site such as site 52A may maintain a database of information about CDs, for example information about all CDs issued by record company 2 can be maintained on that record company's site. There are various alternative ways for users to navigate this information. For example, they could use a Web page containing many hyperlinks as a table of contents, or they could use a conventional search engine. A third way of searching, which is enabled by CD ID 31 of the invention, is for there to be a Web page which invites the user to place in player 32 the CD about which he or she is seeking information, for example CD 30. Upon detection of the presence of CD 30 in the drive, a script in the Web page computes CD ID 31 corresponding to CD 30 and sends it to server 58. Server 58 then displays information about the CD retrieved from a database on the basis of CD ID 31. This information may include a Web address (URL) that is related to the CD (e.g., that of the artists' home page), simple data such as the names of songs on the CD, and also complementary entertainment, including potentially photographs (e.g., of the band), artwork, animations, and video clips. It is also possible to arrange things so that, when the user inserts a CD into the computer, (i) the Web browser is launched if not already running, (ii) the browser computes the CD's unique identifier and from that unique identifier derives a URL, and (iii) the browser does an HTTP get transaction on that URL.

An alternative application of unique identifiers for musical recordings is to employ a CD as a key for entering into a premium area of the Web. There are presently premium areas of the Web to which people are admitted by subscription. A simple form of admission based on the unique identifier is to require, before accessing a particular area of the Web, that the user place in his or her CD drive a particular CD, or a CD published by a particular company or containing the music of a particular band or artist. This is readily accomplished by means of a script which invokes the functions provided by the command plug in and computes a unique identifier.

Another aspect of the invention is the connection of chat rooms with musical recordings. The goal is to provide all participants in a chat room with the same music at approximately the same time.

One conventional network protocol for chat services is Interney Relay Chat (IRC), described J. Oikarinen & D. Reed, Internet Relay Chat Protocol (Internet Request for Comments No. 1459, 1993). In this protocol, when one becomes a client of a chat server, one sends the name of a chat room. The chat server receives messages from all of its clients and relays the messages sent in by one client to all the other clients connected in the same room as that client. The messages which a client sends are typically typed in by the user who is running the client, and the messages which a client receives are typically displayed for the user who is running the client to read.

In a preferred embodiment of the invention, a chat client is customized by means of a plug-in, which we will call the chat plug-in. The chat client is started up by a browser as follows (see FIG. 5). The user connects by means of the browser to a central Web page (box 300) which, upon being downloaded, asks that the user insert a CD into his or her player (box 305). A unique identifier of the CD is computed and communicated back to the server by using the control plug-in described above under the command of a script in the central Web page (box 310). The server then employs the unique identifier to determine whether it has a chat room focused on the CD (box 315). This step may be carried out by looking the unique identifier up in a database using techniques well known in the art. There exists a vast literature on connecting Web pages to databases, e.g., December & Ginsburg, supra, chapter 21. If a chat room focused on the CD exists or can be created, the server responds with the name of that chat room, and the browser starts up a chat client on the user's computer as a client of that chat room (box 320).

The chat room's name is set by the server to contain information about the track which the CD is playing in the other chat room clients' machines and the time at which the track started to play, as well as about the volume at which the CD is playing. The chat client plug-in employs that information to direct the control plug-in to set the CD in the user's computer to play in such a manner that it is approximately synchronized to the CD which is playing in the other chat room clients' machines (box 320).

Each user in the chat room is able to control the CD which is playing in his or her machine. Control actions result in the chat plug-in sending messages to the chat server which describe the control action being taken (box 325). For example, such messages may indicate a change in the position of the CD, a change in the volume, or the ejection of the CD to replace it with another. The chat plug-ins running on the other users' machines, upon seeing a message of this kind, replicate the action (as far as possible) on the other users' machines by using the control plug-in described above (box 330).

In a further aspect of the invention, a chat room focused on a particular musical recording might allow for a voting procedure to select particular tracks. A simple voting procedure would be for each chat plug-in to act upon a change message of the kind described in the preceding paragraph only when it sees two identical consecutive change messages. This would mean that in order to change the track which is being played, it would be necessary for two users to change to that track. The number two may be replaced by a higher number.

In a further aspect of the invention the messages delivered to the users of a chat can be driven from a text file rather than manual typing. This would allow a pre-recorded experience to be played back for a group of chat users. Such a technique may be used to create a pre-recorded, narrated tour of an audio CD.

An important advantage of the embodiment described above is that it may be used with any chat server software which supports the minimal functionality required by Internet Relay Chat or by a protocol providing similar minimum chat service. The additional software required is located in the chat client plug in and in the central Web page, with its connection to a database of CD information.

We claim:

1. A system for transferring information associated with playback of a recording, comprising:
    a first device to reproduce a recording, to identify the recording from information obtained from contents of the recording used to play back contents of the recording perceived by a user and to collect use data associated with the recording;
    a second device to store the use data; and
    a network coupled to said first and second devices to transfer the use data from said first device to said second device.

2. A method of obtaining information associated with playback of recordings at a first device connectable to a second device via a network, comprising:
    collecting, at the first device, use data associated with a recording fixed in a medium possessed by a user and identified by information obtained from the recording used to play back contents of the recording perceived by the user and not stored to identify the recording; and
    transferring the use data from the first device to the second device via the network.

3. A method as recited in claim 2, wherein the use data are related to at least one of a portion of the recording and play time of the recording.

4. A method as recited in claim 3, further comprising:
    obtaining user demographic data; and
    sending the user demographic data to the second device.

5. A method as recited in claim 4, further comprising supplying complementary content for the recording to the first device via the network.

6. A method as recited in claim 5, further comprising selecting the complementary content based on the use data and the user demographic data.

7. A method as recited in claim 2,
    wherein the local device is a computer, and
    wherein said collecting includes monitoring operations performed by the computer while the recording is played.

8. A method as recited in claim 7,
    wherein said monitoring detects software executing on the computer while the recording is played, and
    wherein the use data transferred to the second device include identification of the software executing on the computer while the recording is played.

9. A method as recited in claim 7, wherein said monitoring detects user inputs while the recording is played.

10. A method as recited in claim 7, wherein said monitoring detects operational data transmitted over the network to and from the computer.

11. A method as recited in claim 10, wherein the operational data include at least one uniform resource locator.

12. A method as recited in claim 11, wherein said method further comprises supplying complementary content for the recording to the first device via the network.

13. A method as recited in claim 12,
    wherein the use data include the operational data, and
    wherein said method further comprises:
        sending user demographic data from the first device to the second device via the network; and
        selecting the complementary content based on the use data and the user demographic data.

14. A method as recited in claim 7,
    wherein said collecting detects at least one computer program loaded in the computer, and
    wherein the use data transferred to the second device include identification of the at least one computer program loaded into the computer.

15. A method as recited in claim 14,
    wherein said collecting detects frequency of use of the at least one computer program loaded in the computer, and
    wherein the use data transferred to the second device include the frequency of use of the at least one computer program loaded in the computer.

16. A method as recited in claim 2,
    further comprising registering a user of the first device to obtain a user identifier, and
    wherein said transferring further includes transferring the user identifier with the use data to the second device.

17. A method as recited in claim 16, further comprising:
obtaining user demographic data; and
sending the user demographic data to the second device.

18. A method as recited in claim 17, further comprising supplying complementary content for the recording to the first device via the network.

19. A method as recited in claim 18, further comprising selecting the complementary content based on the use data and the user demographic data.

20. A method as recited in claim 2, wherein the use data include frequency data indicating number of times the recording is played at the first device.

21. A method as recited in claim 20, wherein the recording contains segments, and
wherein the frequency data indicate the number of times the segments are played at the first device.

22. A method of obtaining information associated with playback of recordings containing segments at a first device connectable to a second device via a network, comprising:
identifying at least one segment of a recording, fixed in a medium possessed by a user, based on information obtained from contents of the recording stored in the medium for a purpose other than identifying the recording;
collecting, at the first device, use data associated with the recording, the use data including segment data identifying the at least one segment played at the first device; and
transferring the use data from the first device to the second device via the network.

23. A method as recited in claim 22, wherein the segment data include a number of times the at least one segment has been played at the first device.

24. A method as recited in claim 23, wherein the segment data include how much of the at least one segment has been played each time.

25. A method as recited in claim 22, wherein the segment data include how much of the at least one segment has been played.

26. A method as recited in claim 22, wherein the segment data include how often the at least one segment has been played.

27. A method as recited in claim 22, wherein the medium is a compact disc with audio content, the segments are tracks on the compact disc and the segment data indicate playback of the tracks on the compact disc.

28. A method as recited in claim 22, wherein the medium is a digital versatile disc, the segments are tracks on the digital versatile disc and the segment data indicate playback of the tracks on the digital versatile disc.

29. A method as recited in claim 22,
further comprising identifying the recording based on length of the segments to obtain a recording identifier, and
wherein said transferring includes sending the recording identifier to the second device.

30. A method as recited in claim 29, wherein the medium is a disc and the length of the segments is obtained from table of contents information on the disc.

31. A method as recited in claim 2, wherein the recording is a digital file containing digitized audio signals.

32. A method as recited in claim 31, wherein the digital file contains audio data compressed using MPEG encoding.

33. A method as recited in claim 2, wherein the use data include total time of use of the recording.

34. A method as recited in claim 33, wherein the use data include time of use of the first device.

35. A method as recited in claim 2, further comprising supplying complementary content for the recording to the first device via the network.

36. A method as recited in claim 35, further comprising:
obtaining user demographic data; and
sending the user demographic data to the second device.

37. A method as recited in claim 36, further comprising selecting the complementary content based on the use data and the user demographic data.

38. A method as recited in claim 2, further comprising continuing said collecting and transferring of the use data from the first device to the second device via the network as long as the recording is being played at the first device.

39. A method as recited in claim 2,
further comprising detecting a volume level at which the recording is being played, and
wherein said sending includes sending data indicating the volume level.

40. A method as recited in claim 2,
further comprising reading a recording identifier on the recording, and
wherein said transferring includes sending the recording identifier to the second device.

41. A system for obtaining information based on playback of at least one recording at a first device connected to a second device via a network, comprising:
identification means for identifying a recording based on information obtained from contents of the recording stored in the medium for a purpose other than identifying the recording;
collection means for collecting use data related to at least one of a portion of a recording fixed in a medium possessed by the user, and play time of the recording;
connection means for establishing a connection between the first and second devices;
transmission means for sending the use data from the first device to the second device via the network; and
storage means for storing the use data at the second device.

42. A system as recited in claim 41,
wherein the use data relate to a plurality of recordings, and
wherein the use data include frequency of use of the recordings.

43. A computer-readable storage storing instructions to control a processor to perform a process comprising:
collecting, at a first device, use data associated with playback of a recording, fixed in a medium possessed by a user and identified by information obtained from contents of the recording used to play back contents of the recording perceived by the user; and
transferring the use data from the first device to a second device connected to the first device via a network.

44. A computer-readable storage as recited in claim 43, wherein said process further comprises:
obtaining user demographic data; and
sending the user demographic data to the second device.

45. A computer-readable storage as recited in claim 44, wherein said process further comprises obtaining as the use data, information regarding playing of at least one portion of the recording.

46. A computer-readable storage as recited in claim 45, wherein said process further comprises supplying complementary content for the recording to the first device via the network.

47. A computer-readable storage as recited in claim 46, wherein said process further comprises selecting the complementary content based on the use data and the user demographic data.

48. A computer-readable storage as recited in claim 43,
wherein said process further comprises monitoring operations performed by the first device during playback of the recording, and
wherein the use data indicate the operations performed by the first device during playback of the recording.

49. A computer-readable storage as recited in claim 48, wherein the operational data include at least one uniform resource locator.

50. A computer-readable storage as recited in claim 49, wherein said process further comprises supplying complementary content for the recording to the first device via the network.

51. A computer-readable storage as recited in claim 50, wherein said process further comprises:
sending user demographic data from the first device to the second device via the network; and
selecting the complementary content based on the use data and the user demographic data.

52. A computer-readable storage as recited in claim 43,
wherein the first device is a computer,
wherein said collecting detects at least one computer program loaded in the computer, and
wherein the use data transferred to the second device include identification of the at least one computer program loaded into the computer.

53. A computer-readable storage as recited in claim 52,
wherein said collecting detects frequency of use of the at least one computer program loaded in the computer, and
wherein the use data transferred to the second device include the frequency of use of the at least one computer program loaded in the computer.

54. A computer-readable storage as recited in claim 43,
wherein said process further comprises registering a user of the first device to obtain a user identifier, and
wherein said transferring further includes transferring the user identifier with the use data to the second device.

55. A computer-readable storage as recited in claim 54, wherein said process further comprises:
obtaining user demographic data; and
sending the user demographic data to the second device.

56. A computer-readable storage as recited in claim 55, wherein said process further comprises supplying complementary content for the recording to the first device via the network based on the use data and the user demographic data.

57. A computer-readable storage as recited in claim 43, wherein the recording contains segments,
wherein said process further comprises identifying at least one segment of the recording, and
wherein the use data include segment data identifying the at least one segment played at the first device.

58. A computer-readable storage as recited in claim 57, wherein the segment data include a number of times the at least one segment has been played at the first device.

59. A computer-readable storage as recited in claim 58, wherein the segment data include how much of the at least one segment has been played each time.

60. A computer-readable storage as recited in claim 57, wherein the segment data include how much of the at least one segment has been played.

61. A computer-readable storage as recited in claim 57, wherein the segment data include how often the at least one segment has been played.

62. A system for transferring information associated with playback of a recording, comprising:
a first device to reproduce a recording fixed in a medium possessed by a user, to identify the recording from information obtained from contents of the recording stored in the medium for a purpose other than identifying the recording, and to collect use data associated with the recording;
a second device to store the use data; and
a network coupled to said first and second devices to transfer the use data from said first device to said second device.

63. A system as recited in claim 62, wherein the recording is a compact disc with audio content stored on tracks and the use data indicate playback of the tracks on the compact disc.

64. A system as recited in claim 63,
wherein said first device obtains a recording identifier based on length of the tracks, and
wherein said network sends the recording identifier to said second device.

65. A system as recited in claim 62, wherein the recording is a digital versatile disc and the use data indicate playback of tracks on the digital versatile disc.

66. A system as recited in claim 62, wherein the recording is a computer file containing digitized audio signals.

67. A system as recited in claim 66, wherein the computer file contains audio data compressed using MPEG encoding.

68. A system as recited in claim 62, wherein said network transfers complementary content for the recording from said second device to said first device.

69. A system as recited in claim 68,
wherein said first device obtains user demographic data; and
wherein said network sends the user demographic data from said first device to said second device.

70. A system as recited in claim 69, further comprising wherein said second device selects the complementary content based on the use data and the user demographic data.

71. A system as recited in claim 62, wherein said first and said second devices are not always connected via said network and said first device stores the use data when not connected to said second device and transmits the use data to said second device after a connection is established.

72. A system as recited in claim 62, wherein said first device automatically generates a recording identifier from information included in the recording and sends the recording identifier to said second device with the use data.

73. A system as recited in claim 72, wherein the recording includes at least two segments and said first device generates the recording identifier based on length of the segments.

74. A computer-readable storage as recited in claim 43, wherein said process further comprises:
automatically generating a recording identifier from information included in the recording; and
sending the recording identifier with the use data from the first device to the second device.

75. A computer-readable storage as recited in claim 74,
wherein the recording includes at least two segments, and
wherein said generating generates the recording identifier based on length of the segments.

76. A computer-readable storage as recited in claim 43,
wherein said collecting is performed regardless of whether the first and second devices are connected, wherein said process further includes establishing a connection between the first and second devices, and wherein said transferring transfers all of the use data collected while the first and second devices were not connected, from the first device to the second device via the network after the first and second devices are connected.

77. A method as recited in claim 2, wherein the recording is fixed in a medium possessed by a user of the first device.

78. A method as recited in claim 2, further comprising:

automatically generating a recording identifier from information included in the recording; and sending the recording identifier with the use data from the first device to the second device.

79. A method as recited in claim 78, wherein the recording includes at least two segments, and wherein said generating generates the recording identifier based on length of the segments.

80. A method as recited in claim 22, further comprising:

automatically generating a recording identifier from the segment data; and sending the recording identifier with the use data from the first device to the second device.

81. A method as recited in claim 22, wherein said collecting is performed regardless of whether the first and second devices are connected, wherein said process further includes establishing a connection between the first and second devices, and wherein said transferring transfers all of the use data collected while the first and second devices were not connected, from the first device to the second device via the network after the first and second devices are connected.

82. A method as recited in claim 22, wherein the recording is fixed in a medium possessed by a user of the first device.

83. A method as recited in claim 2, wherein said collecting collects the use data for a plurality of recordings fixed in at least one medium possessed by the user, and wherein said transferring includes providing identification of the user.

84. A method as recited in claim 83, further comprising storing the use data at the second device to provide an indication of the recordings played by the user.

85. A method as recited in claim 22, wherein said collecting collects the use data for a plurality of recordings fixed in at least one medium possessed by the user, and wherein said transferring includes providing identification of the user.

86. A method as recited in claim 85, further comprising storing the use data at the second device to provide an indication of the recordings played by the user.

87. A system as recited in claim 41, wherein said collecting means collects the use data for a plurality of recordings fixed in at least one medium possessed by the user, and wherein said sending means further sends data identifying the user.

88. A system as recited in claim 87, wherein said storing means stores the use data at the second device to provide an indication of the recordings played by the user.

89. A computer-readable storage as recited in claim 43, wherein said collecting collects the use data for a plurality of recordings fixed in at least one medium possessed by the user, and wherein said transferring includes providing identification of the user.

90. A computer-readable storage as recited in claim 89, further comprising storing the use data at the second device to provide an indication of the recordings played by the user.

91. A system as recited in claim 62, wherein said first device collects the use data for a plurality of recordings fixed in at least one medium possessed by the user, and wherein said network further transfers data identifying the user.

92. A system as recited in claim 91, wherein said second device stores the use data to provide an indication of the recordings played by the user.

93. A method of obtaining information associated with playback of recordings at a first device connectable to a second device via a network, comprising:

collecting, at the first device, use data associated with a recording identified by information obtained from contents of the recording used to play back contents of the recording perceived by a user; and transferring the use data from the first device to the second device via the network.

94. A method of obtaining information associated with playback of recordings containing segments at a first device connectable to a second device via a network, comprising:

identifying at least one segment of a recording, based on information obtained from or related to the segment and included in the recording to enable playback of the segment rather than to identify the segment;

collecting, at the first device, use data associated with the at least one segment of the recording, the use data including segment data identifying the at least one segment played at the first device; and transferring the use data from the first device to the second device via the network.

95. A system for obtaining information based on playback of at least one recording at a first device connected to a second device via a network, comprising:

identification means for identifying a recording based on information obtained from contents of the recording used to play back contents of the recording perceived by a user;

collection means for collecting use data related to at least one of a portion of a recording fixed in a medium possessed by the user, and play time of the recording;

connection means for establishing a connection between the first and second devices;

transmission means for sending the use data from the first device to the second device via the network; and storage means for storing the use data at the second device.

96. A computer-readable storage storing instructions to control a processor to perform a process comprising:

collecting, at a first device, use data associated with playback of a recording identified by information obtained from contents of the recording used to play back contents of the recording perceived by a user; and transferring the use data from the first device to a second device connected to the first device via a network.

97. A system as recited in claim 1, wherein the information used to identify the recording was not stored for the purpose of indentifying the recording.

98. A method as recited in claim 22, wherein the medium is a compact disc, each segment is a portion of a track on the compact disc determined by track number and playing time within the track, and the segment data indicate playback of the segments on the compact disc.

99. A method as recited in claim 22, wherein the information used to identify the recording is stored in the medium prior to possession of the medium by the user.

100. A computer-readable storage as recited in claim 43, wherein the information used to identify the recording was not stored for the purpose of identifying the recording.

101. A method as recited in claim 93, wherein the information used to identify the recording was not stored for the purpose of identifying the recording.

102. A system as recited in claim 95, wherein the information used to identify the recording was not stored for the purpose of identifying the recording.

103. A computer-readable medium as recited in claim 96, wherein the information used to identify the recording was not stored for the purpose of identifying the recording.

* * * * *

US006330593C1

(12) EX PARTE REEXAMINATION CERTIFICATE (9292nd)
United States Patent
Roberts et al.

(10) Number: US 6,330,593 C1
(45) Certificate Issued: Sep. 11, 2012

(54) SYSTEM FOR COLLECTING USE DATA RELATED TO PLAYBACK OF RECORDINGS

(75) Inventors: Dale Tyson Roberts, Sausalito, CA (US); Ann E. Greenberg, San Anselmo, CA (US)

(73) Assignee: Gracenote, Inc., Emeryville, CA (US)

Reexamination Request:
No. 90/011,270, Nov. 17, 2010

Reexamination Certificate for:
Patent No.: 6,330,593
Issued: Dec. 11, 2001
Appl. No.: 09/379,589
Filed: Aug. 24, 1999

Related U.S. Application Data

(62) Division of application No. 09/060,876, filed on Apr. 15, 1998, now Pat. No. 6,154,773.

(51) Int. Cl.
*G06F 13/00* (2006.01)

(52) U.S. Cl. .............................. 709/217; 707/E17.009; 707/E17.119; 709/202; 709/219; 719/329

(58) Field of Classification Search .................. 709/217
See application file for complete search history.

(56) References Cited

To view the complete listing of prior art documents cited during the proceeding for Reexamination Control Number 90/011,270, please refer to the USPTO's public Patent Application Information Retrieval (PAIR) system under the Display References tab.

*Primary Examiner* — Joshua Campbell

(57) ABSTRACT

Entertainment content complementary to a musical recording is delivered to a user's computer by means of a computer network link. The user employs a browser to access the computer network. A plug-in for the browser is able to control an audio CD or other device for playing the musical recording. A script stored on the remote computer accessed over the network is downloaded. The script synchronizes the delivery of the complementary entertainment content with the play of the musical recording.

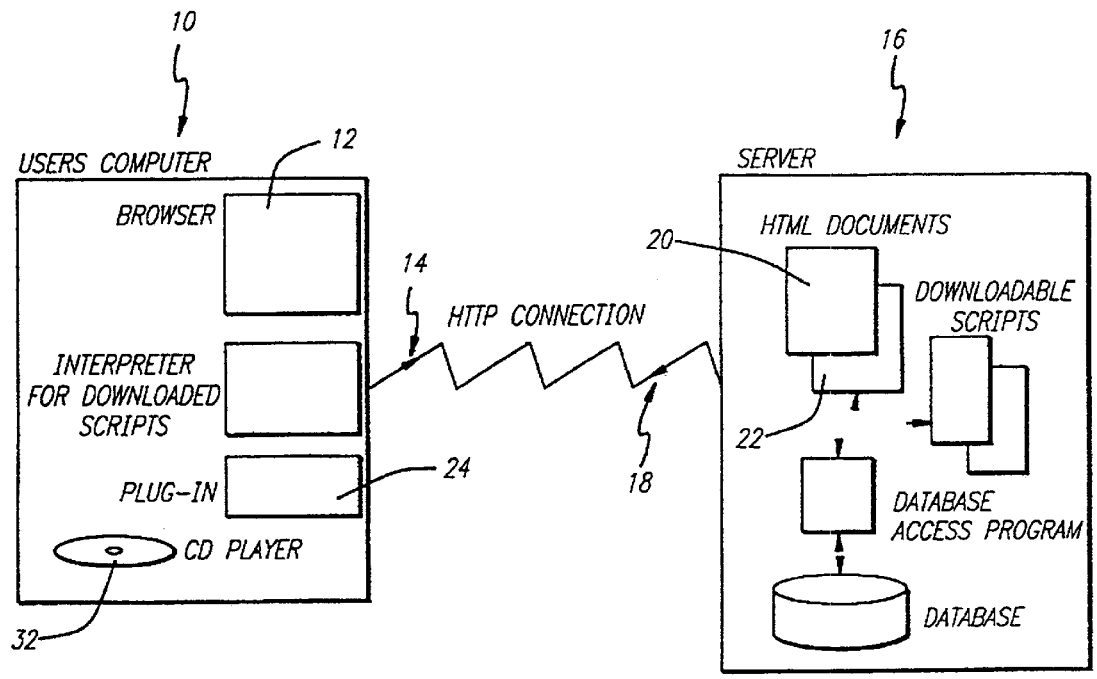

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-6, 22, 35-37, 41, 62, 68-70, 85, 93, 95 and 96 are cancelled.

Claims 7-21, 23-34, 38-40, 42-61, 63-67, 71-84, 86-92, 94 and 97-103 were not reexamined.

* * * * *